United States Patent
Kagemoto et al.

(10) Patent No.: US 6,823,324 B2
(45) Date of Patent: Nov. 23, 2004

(54) DATA BROADCAST PROGRAM PRODUCING APPARATUS, A COMPUTER PROGRAM FOR PRODUCING DATA BROADCAST PROGRAMS, AND A COMPUTER-READABLE RECORDING MEDIUM STORING THE COMPUTER PROGRAM

(75) Inventors: Hideki Kagemoto, Nara (JP); Takashi Kakiuchi, Toyonaka (JP); Toshihiro Hishida, Kobe (JP); Kazuo Okamura, Kawasaki (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 786 days.

(21) Appl. No.: 09/838,765

(22) Filed: Apr. 19, 2001

(65) Prior Publication Data

US 2002/0056130 A1 May 9, 2002

(30) Foreign Application Priority Data

Apr. 21, 2000 (JP) .................................... 2000-121679

(51) Int. Cl.[7] ............................................. G06F 15/18
(52) U.S. Cl. ...................................................... 706/47
(58) Field of Search ........................................... 706/47

(56) References Cited

U.S. PATENT DOCUMENTS

| | | | | |
|---|---|---|---|---|
| 5,887,062 A | * | 3/1999 | Maeda et al. ............... 380/234 |
| 6,035,304 A | * | 3/2000 | Machida et al. .......... 707/104.1 |
| 6,091,456 A | * | 7/2000 | Schaas ......................... 348/460 |
| 6,449,514 B1 | * | 9/2002 | Natsubori et al. ............. 700/19 |
| 6,571,220 B1 | * | 5/2003 | Ogino et al. ................... 705/51 |
| 6,622,004 B1 | * | 9/2003 | Sonoda et al. ............. 455/3.05 |
| 6,674,477 B1 | * | 1/2004 | Yamaguchi et al. ...... 348/387.1 |
| 6,700,624 B2 | * | 3/2004 | Yun ............................ 348/555 |
| 6,722,215 B2 | * | 4/2004 | Caradonna et al. ......... 73/866.5 |

OTHER PUBLICATIONS

Balancing Push and Pull for Data Broadcast*, Swarup Acharya, Michael Franklin, Stanley Zdonik, 1997, ACM pps. 183–194.*

* cited by examiner

Primary Examiner—Anthony Knight
Assistant Examiner—Michael B. Holmes

(57) ABSTRACT

A template storage unit stores a plurality of templates. A material data receiving unit receives material data. A combining rule storage unit stores a plurality of combining rules that each indicate a combining condition as a combination of attribute information, such as a type of material data and a version number, and a name of a template to be combined with when the combining condition is met. A combining instruction unit judges whether a combining condition of any of the combining rules is met or not and instructs a combining unit to combine the material data with the template when the combining condition is met. The combining unit combines the material data or a combination of the material data with the specified template according to the combining rule.

11 Claims, 18 Drawing Sheets

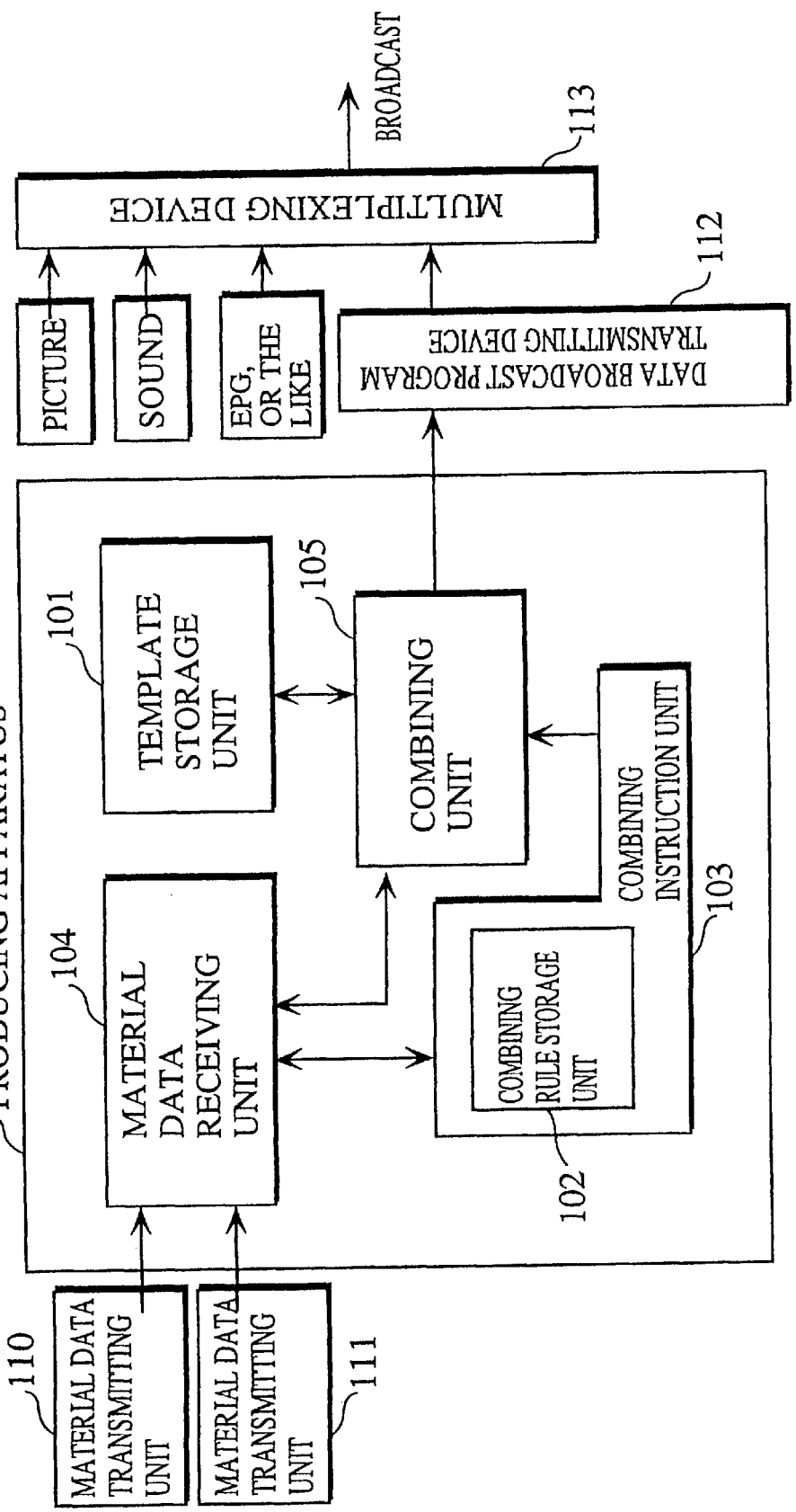

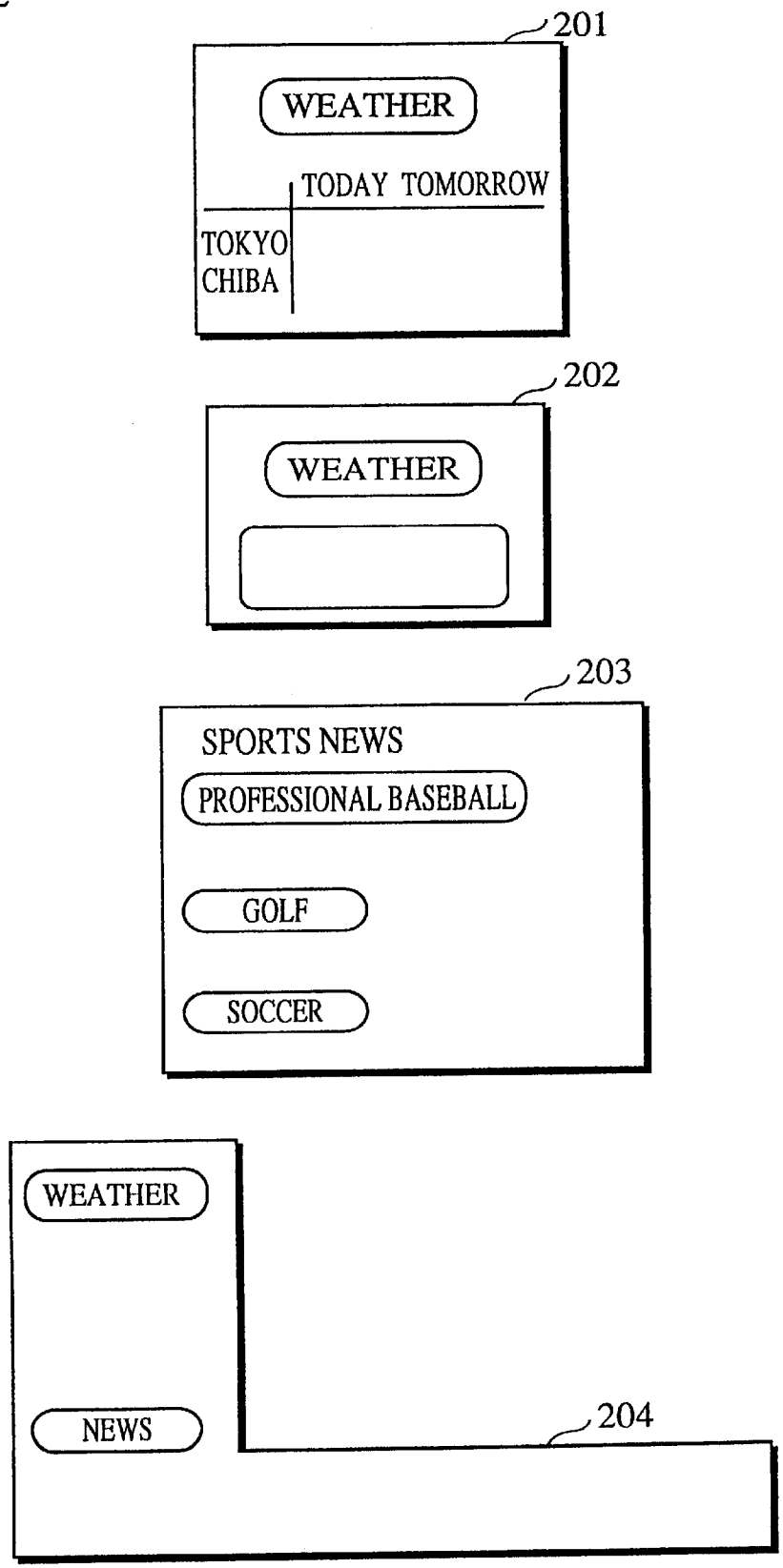

FIG. 3

STORED COMBINING RULES 1-4

COMBINING RULE 1

AT X TIME, COMBINE WEATHER DATA WITH WEATHER TEMPLATE 1

COMBINING RULE 2

COMBINE WEATHER DATA WITH SAME VERSION NUMBER AS FORECASTER'S COMMENT WITH WEATHER TEMPLATE 2

COMBINING RULE 3

AT SET TIME EACH DAY, COMBINE DATA OF SEPARATE SPORTING EVENTS WITH SPORTS NEWS TEMPLATE

COMBINING RULE 4

WHEN NEW PIECE OF WEATHER DATA OR NEWS DATA IS RECEIVED, COMBINE WITH DIGEST TEMPLATE AFTER PREDETERMINED WAIT PERIOD

FIG. 4

|  | TODAY | TOMORROW |
|---|---|---|
| TOKYO | FINE | FINE |
| CHIBA | CLOUDY | RAINY |
| SAITAMA | CLOUDY | RAINY |
| ⋮ | ⋮ | ⋮ |

401

402
Tomorrow will be fine.

404
It will be a fine autumn day.

403
Tonight will be rainy.

405
It will start to rain this evening.

406
ORIC 6-5 DAIE
TIGER 2-0 DRAGON

407
××OPEN
①PACKWEL -10 278

408
J2 URAWA RESS 6 WIN STREAK

409
· G7 Joint Statement: Japan to Continue Zero Interest
· New Female Governor in Kumamoto

FIG. 5

| TYPE | VERSION | RECEIVED TIME | SIZE |
|---|---|---|---|
| EXCHANGE RATE | 3 | 2000/12/03 22:10:50 | 21 |
| NEWS | 10 | 2000/12/03 22:11:11 | 305 |
| EXCHANGE RATE | 4 | 2000/12/03 22:13:45 | 30 |
| WEATHER | 30 | 2000/12/03 22:15:12 | 150 |
| NEWS | 11 | 2000/12/03 22:15:50 | 380 |
| EXCHANGE RATE | 5 | 2000/12/03 22:16:03 | 24 |
| EXCHANGE RATE | 6 | 2000/12/03 22:20:13 | 28 |
| WEATHER | 31 | 2000/12/03 22:25:50 | 177 |

WEATHER

|  | TODAY | TOMORROW |
|---|---|---|
| TOKYO | FINE | FINE |
| CHIBA | CLOUDY | RAINY |

602

WEATHER

Tonight will be rainy.

It will start to rain this evening.
Remember to take an umbrella with you.

603

SPORTS NEWS

PROFESSIONAL BASEBALL
ORIC  6-5   DAIE
TIGER 2-0   DRAGON

GOLF
××OPEN
①PACKWEL  -10   278

SOCCER
J2   URAWA RESS   6 WIN STREAK

FIG. 13
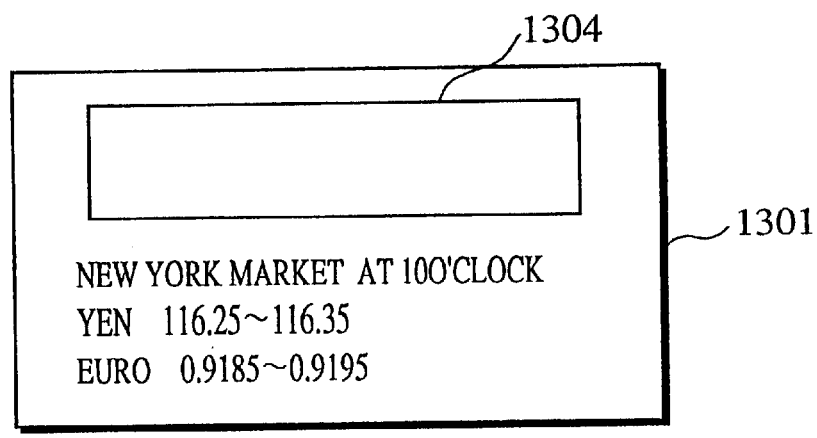
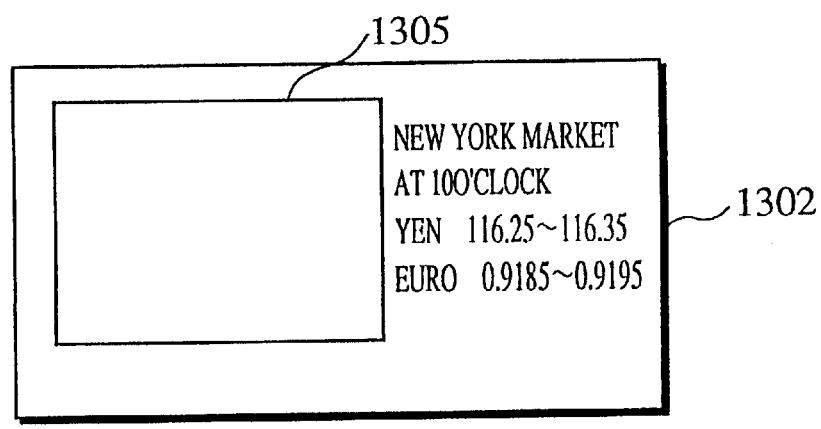
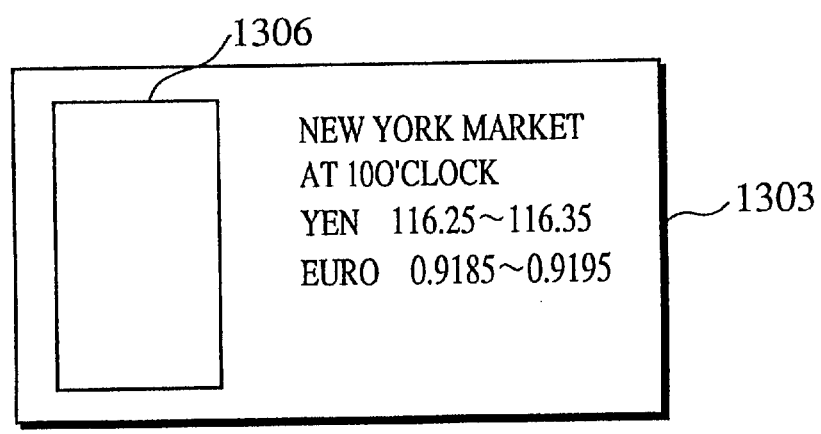

FIG. 14

STORED COMBINING RULES 5-7

COMBINING RULE 5

COMBINE IMAGE DATA HAVING PREDETERMINED WIDTH-HEIGHT RATIO 4.0 WITH LANDSCAPE IMAGE TEMPLATE

COMBINING RULE 6

COMBINE IMAGE DATA HAVING PREDETERMINED WIDTH-HEIGHT RATIO 1.33 WITH NORMAL IMAGE TEMPLATE

COMBINING RULE 7

COMBINE IMAGE DATA HAVING PREDETERMINED WIDTH-HEIGHT RATIO 0.6 WITH PORTRAIT IMAGE TEMPLATE

FIG. 15

STORED COMBINING RULES 8-10

COMBINING RULE 8

COMBINE IMAGE DATA HAVING PREDETERMINED WIDTH-HEIGHT RATIO OF 2.5 OR GREATER WITH LANDSCAPE IMAGE TEMPLATE

COMBINING RULE 9

COMBINE IMAGE DATA HAVING PREDETERMINED WIDTH-HEIGHT RATIO, R, WHERE $1.0 \leq R < 2.5$ WITH NORMAL IMAGE TEMPLATE

COMBINING RULE 10

COMBINE IMAGE DATA HAVING PREDETERMINED WIDTH-HEIGHT RATIO OF LESS THAN 1.0 WITH PORTRAIT IMAGE TEMPLATE

FIG. 17
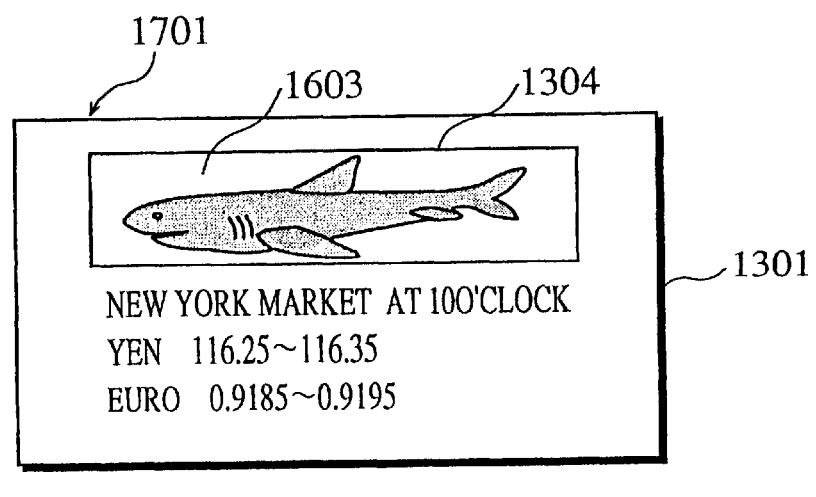
(a)
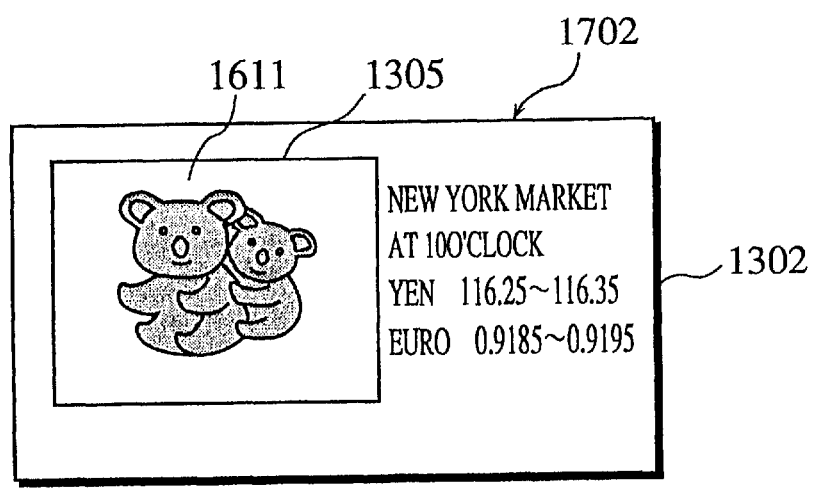
(b)

DATA BROADCAST PROGRAM PRODUCING APPARATUS, A COMPUTER PROGRAM FOR PRODUCING DATA BROADCAST PROGRAMS, AND A COMPUTER-READABLE RECORDING MEDIUM STORING THE COMPUTER PROGRAM

BACKGROUND OF THE INVENTION (1) Field of the Invention

The present invention relates to a data broadcast program producing apparatus.

(2) Description of Related Art

A conventional data broadcast program producing apparatus holds a plurality of templates. When receiving a piece of material data, the data broadcast program producing apparatus immediately combines the piece of material data and a template corresponding to a type of the received piece of material data. Here, a data broadcast program is a program that is broadcasted as a collection of image data, bitmapped data, and a variety of information described in BML (Broadcast Markup Language) such as exchange rate, weather, stock price, and news.

For instance, when the type of material data is exchange rate, the piece of material data shows the exchange rates of yen to dollar and yen to euro.

On the other hand, a template which is to be combined with the piece of material data includes rectangular frames which show the type of the material data, for example, "exchange rate" and fixed expressions such as "○:○", "○ yen on a dollar", and "○ yen on an euro" that are to be combined with the contents of the piece of material data. The contents of piece of material data, for example, "14:00", "104.75 yen on a dollar", and "98.56 yen on an euro" are written in this template to produce a data broadcast program.

However, when a piece of material data is received, the conventional data broadcast program producing apparatus immediately combines the piece of material data with a fixed template corresponding to the type of the piece of material data and lacks flexibility in producing a data broadcast program.

Also, if a piece of material data of the same type is repeatedly updated and received at short time intervals such as every thirty seconds, the data broadcast program producing apparatus performs the combining of the material data and the corresponding template repeatedly. However, it takes time for a receiver that has received such a data broadcast program to display the data broadcast program, so a problem such as a screen flicker occurs.

Furthermore, when the type of the piece of material data is image data, the conventional data broadcast program producing apparatus has only one size of frame for image data regardless of a variety of sizes of the image data. Therefore, if the piece of image data is perpendicularly or horizontally long or wide, the piece of image data may not be able to be combined with the template appropriately.

SUMMARY OF THE INVENTION

Concerning with above inconvenience, the first object of the present invention is to provide a data broadcast program producing apparatus that can decide a timing of a combining operation of at least one piece of material data and a template and also can combine a plurality of types of material data with a template.

The second object of the present invention is to provide a data broadcast program producing apparatus that can easily combine a piece of image data as material data with a template in consideration of a size of the piece of image data.

These objects are achieved by a data broadcast program producing apparatus including: a template storage unit for storing a plurality of templates; a material data receiving unit for receiving at least one piece of material data for a data broadcast program, each piece of material data being accompanied by a plurality of pieces of attribute information; a combining rule storage unit for storing a plurality of combining rules, each combining rule associating a combining condition with one of the plurality of templates stored in the template storage unit; a judging unit for judging whether a combining condition of any of the plurality of combining rules is met, based on a combination of at least two pieces of attribute information accompanying the at least one piece of material data received by the material data receiving unit; and a combining unit for combining, when the judging unit judges that the combining condition is met, the at least one piece of material data with a template associated with the combining condition, in accordance with the combining rule.

With this construction, a data broadcast program can be produced by combining a variety of material data with a template according to one of a variety of combining rules.

Here, the plurality of pieces of attribute information accompanying each piece of material data may include at least two out of (a) a type of the piece of material data, (b) a version number of the piece of material data, and (c) a time at which the piece of material data has been received, wherein each combining rule stored in the combining rule storage unit (a) indicates a combining condition whose first criterion is a type of the piece of material data and (b) specifies a template which is to be combined with the piece of material data.

With this construction, according to one of combining rules in which the plurality of pieces of attribute information of each piece of material data are criteria for judging whether a condition of the combining rule is met, a data broadcast program can be produced by combining at least one piece of material data with a specified template.

Here, the combining condition may specify a combination of a plurality of different types of pieces of material data.

With this construction, a plurality of types of material data can be combined with a template.

Here, the combining condition can be that the plurality of different types of pieces of material data has a same version number.

This construction prevents inconsistency of contents between a plurality of pieces of material data.

Here, the judging unit may have a timer, and the combining condition is a predetermined time of day.

With this construction, the latest information of a plurality of types of material data can be combined at an effective time.

Here, the combining condition may be that when a new piece of material data is received, a predetermined period has passed after any piece of material data was received.

This construction prevents inconvenience on display control of a receiver that receives the data broadcast program even when the material data is repeatedly updated.

Here, the combining condition may be that either of a version number or a received time shows that a predetermined type of a new piece of material data has been received by the material data receiving unit while checking that a piece of material data has been received at predetermined intervals.

With this construction, combining of the piece of material data and a template can be performed at an appropriate timing.

The second object of the present invention is achieved by the plurality of templates including templates that each hold an image frame having a different width-to-height ratio, wherein when the piece of material data is image data, the image data is further accompanied by a piece of attribute information showing a width and a height of the image data, wherein when the piece of material data is image data, the combining condition is that a width-to-height ratio of the image data is a predetermined value, and wherein the judging unit calculates the width-to-height ratio of the image data from the piece of attribute information showing the width and the height of the image data to judge whether a combining condition of any of the combining rules is met.

This construction enables to put a wide or long piece of image data into an image frame.

Here, the combining unit may include: an image frame ratio calculating unit for calculating a width-to-height ratio of an image frame of the template associated with the combining condition in the combining rule when the combining condition is that a width-to-height ratio of the image data is in a predetermined range; a width-to-height ratio judging unit for judging whether the width-to-height ratio of the image data calculated by the judging unit is same as the width-to-height ratio of the image frame; and an image data adjusting/combining unit for, (a) when the width-to-height ratio of the image data is the same as the width-to-height ratio of the image frame, combining of image data with the template and,(b) when the width-to-height ratio of the image data is different from the width-to-height ratio of the image frame, adjusting a size of the image data by either increasing or decreasing one of the width and the height of the image data so that the width-to-height ratio of the image data becomes same as the width-to-height ratio of the image frame and combining of image data with the template.

This construction can adjust a size of the piece of image data to put into an image frame.

These objects of the present invention are also achieved by a computer program for a data broadcast program producing apparatus including: a template storage unit for storing a plurality of templates; and a combining rule storage unit for storing a plurality of combining rules that associate combining conditions with templates stored in the template storage unit, the computer program including: a material data receiving step for receiving at least one piece of material data for a data broadcast program, each piece of material data being accompanied by a plurality of pieces of attribute information; a judging step for judging whether a combining condition of any of the plurality of combining rules is met, based on a combination of at least two pieces of attribute information accompanying the at least one piece of material data received by the material data receiving step; and a combining step for combining, when the judging step judges that the combining condition is met, the at least one piece of material data with a template associated with the combining condition, in accordance with the combining rule.

When this program is applied to a data broadcast program producing apparatus, a variety of material data can be combined with a template.

Moreover, these objects of the present invention are achieved by a computer-readable recording medium storing a computer program for a data broadcast program producing apparatus including: a template storage unit for storing a plurality of templates; and a combining rule storage unit for storing a plurality of combining rules that associate combining conditions with templates stored in the template storage unit, the computer program including: a material data receiving step for receiving at least one piece of material data for a data broadcast program, each piece of material data being accompanied by a plurality of pieces of attribute information; a judging step for judging whether a combining condition of any of the plurality of combining rules is met, based on a combination of at least two pieces of attribute information accompanying the at least one piece of material data received by the material data receiving step; and a combining step for combining, when the judging step judges that the combining condition is met, the at least one piece of material data with a template associated with the combining condition, in accordance with the combining rule.

With this construction, when the program is applied to a data broadcast program producing apparatus that only can combine a definite combination of one piece of material data to one template, a variety of material data can be combined with a template.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1 shows a construction of a data broadcast program producing apparatus in a first embodiment of the present invention;

FIG. 2 shows part of templates stored in a template storage unit in the first embodiment;

FIG. 3 shows part of combining rules stored in a combining rule storage unit in the first embodiment;

FIG. 4 shows part of material data that is received and stored by a material data receiving unit in the first embodiment;

FIG. 5 shows an example of attribute information stored in a storage area in the material data receiving unit in the first embodiment;

FIG. 6 shows data broadcast programs that are produced by a combining unit in the first embodiment;

FIG. 13 shows part of templates stored in a template storage unit in a second embodiment of the present invention;

FIG. 14 shows part of combining rules stored in a combining rule storage unit in the second embodiment;

FIG. 15 part of further combining rules stored in a combining rule storage unit in the second embodiment;

FIG. 17 shows data broadcast programs produced by a combining unit in the second embodiment;

DESCRIPTION OF THE PREFERRED EMBODIMENTS

Figure 7:
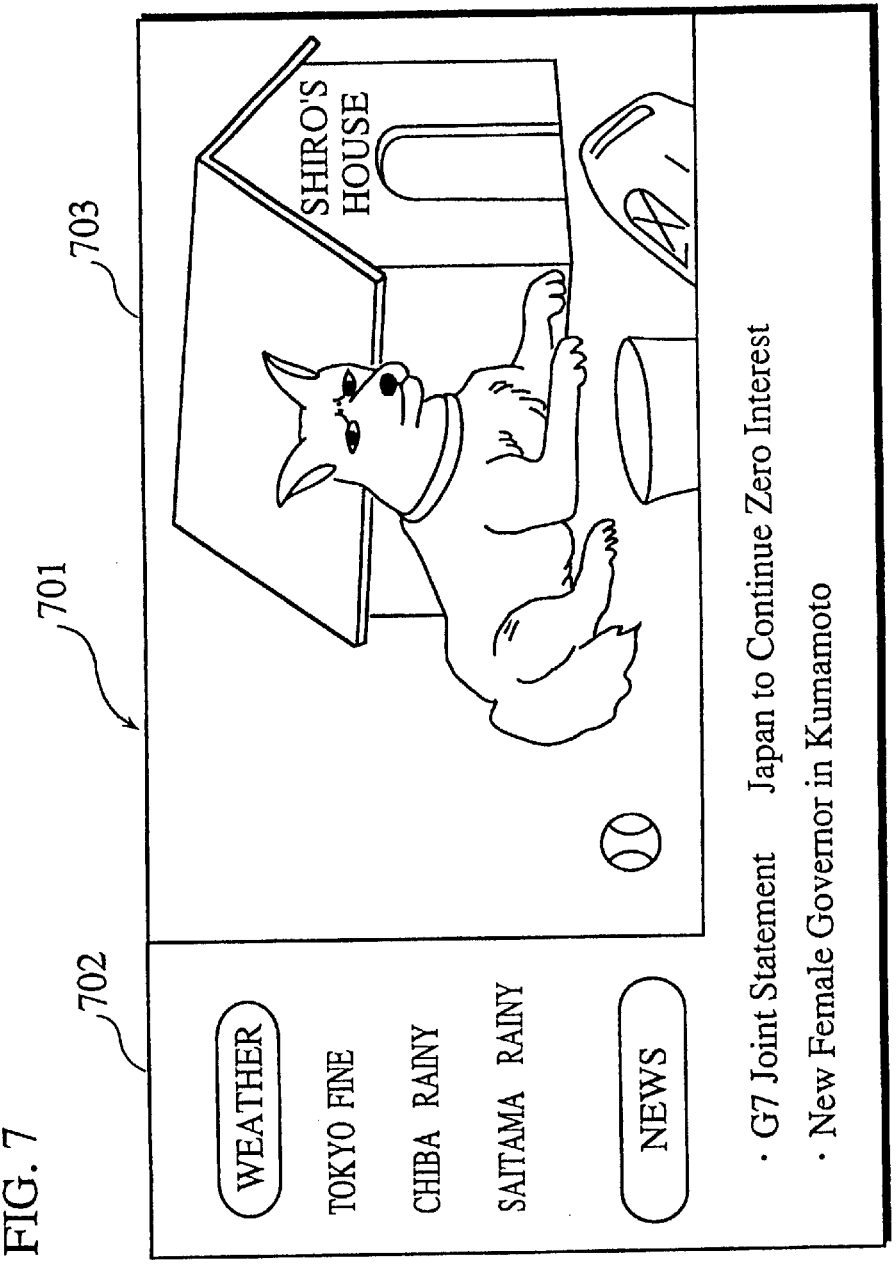
FIG. 7 shows an example display on a monitor of a receiver when a data broadcast program produced by the combining unit is transmitted.

Preferred embodiments of a data broadcast program producing apparatus of the present invention are described with drawings as below.

First Embodiment

FIG. 1 shows a construction of a data broadcast program producing apparatus in a digital broadcast system according to the first embodiment of the present invention.

The data broadcast program producing apparatus includes a template storage unit 101, a combining instruction unit 103 including a combining rule storage unit 102, a material data receiving unit 104, and a combining unit 105.

The template storage unit 101 stores a plurality of templates that are each fixed irrespective of the contents of material data of a data broadcast program. Each template corresponds to a type or a combination of at least two types of material data.

FIG. 2 shows examples of templates stored in the template storage unit 101.

A template 201 is a weather template 1 to be combined with the content of the material data whose type is weather.

A template 202 is a compound weather template 2 to be combined with the contents of two types of material data which are weather and weather forecaster's comment.

A template 203 is a compound sports news template to be combined with the contents of three types of material data which are professional baseball, golf, and soccer.

A template 204 is a compound digest template to be combined with the contents of two types of material data which are weather and news.

Here, these templates are described in BML or PNG (Portable Network Graphics).

The combining rule storage unit 102 stores a plurality of combining rules created by producers of data broadcast programs.

A combining rule provides that a piece of material data received by the material data receiving unit 104 is combined with which template under which condition.

FIG. 3 shows part of combining rules stored in the combining rule storage unit 102.

A combining rule 1 indicates that the latest version of piece of material data of weather is combined with the weather template 1 every thirty minutes to produce a data broadcast program.

In the same way, a combining rule 2 and the other combining rules each indicate a condition for combining of at least one piece of material data and a template and a name of the template to be used when the condition is met.

The combining instruction unit 103 reads all combining rules from the combining rule storage unit 102. The combining instruction unit 103 also checks attribute information of material data, which is stored in the material data receiving unit 104. When the attribute information meets a condition of any of the combining rules, the combining instruction unit 103 notifies the combining unit 105 of the combining rule and instructs the combining unit 105 to produce a data broadcast program. A specific example of this processing will be described later.

A material data receiving unit 104 has a storage area. When receiving a piece of material data from an external material data transmitting units 110 or 111, the material data receiving unit 104 stores it in the storage area. Since the piece of material data is accompanied by attribute information, the attribute information is stored in the storage area together with the piece of material data.

FIG. 4 shows part of material data stored in the storage area of the material data receiving unit 104. Note that material data is described in BML or PNG, in the same way as a template.

Material data 401 is material data whose type is weather.

Also, a piece of material data 402 and a piece of material data 403 are weather, whereas a piece of material data 404 and a piece of material data 405 are weather forecaster's comments. The piece of material data 402 and the piece of material data 404 are version 3, and the piece to of material data 403 and the piece of material data 405 are version 4.

A piece of material data 406 is material data that belongs to professional baseball, a piece of material data 407 is material data that belongs to golf, and a piece of material data 408 is material data that belongs to soccer.

A piece of material data 409 is material data that belongs to news.

FIG. 5 shows an example of an attribute information table stored in the storage area of the material data receiving unit 104. The attribute information table 501 shows attribute information such as a type 502, a version number 503, a received time 504, and a size 505 for each piece of material data.

The type 502 shows a type of a piece of material data such as exchange rate, news, weather, news, but also may show weather forecaster's comment, professional baseball, golf, soccer, or the like.

The version number 503 shows a version number of the piece of material data.

The received time 504 shows a time which is written by the material data receiving unit 104 when the piece of material data is received.

The size 505 shows a size of the piece of material data.

The type 502, the version number 503, and the size 505 are transmitted from the material data transmitting unit 110 or the like along with the piece of material data.

When the combining instruction unit 103 specifies at least one piece of material data and a template which are to be combined, the combining unit 105 reads (a) the piece of material data from the storage area in the material data receiving unit 104 and (b) the template from the template storage unit 101 and combines them. Then the combining unit 105 outputs the combined data as a data broadcast program to the data broadcast program transmitting device 112.

The processing of producing a data broadcast program is explained in more detail below.

Suppose a data broadcast program is produced by combining a piece of material data of weather with a template according to the combining rule 1 shown in FIG. 3.

The combining instruction unit 103 instructs the combining unit 105 to combine the piece of material data of weather with the weather template 1 and resets a timer. After thirty minutes, the combining instruction unit 103 judges that new piece of material data of weather has been received with reference to the attribute information table 501 in the material data receiving unit 104. On judging this, the combining instruction unit 103 instructs next combining of the latest piece of material data and the weather template 1. When a piece of material data 401 shown in FIG. 4 is received as the latest piece of material data of weather by the material data receiving unit 104, the combining unit 105 combines the piece of material data 401 with the weather template 1 to produce a data broadcast program 601 shown in FIG. 6.

Next, suppose a data broadcast program is produced according to the combining rule 2. The combining instruction unit 103 judges that a piece of material data of weather and a piece of material data of weather forecaster's comment have been received by the material data receiving unit 104 by monitoring the attribution information table 501. Here, a weather forecaster's comment is omitted in FIG. 5. When version numbers of these pieces of material data are the same, the combining instruction unit 103 instructs the combining unit 105 to combine them according to the combining rule 2. When a piece of material data 403 and a piece of material data 405 (shown in FIG. 4) are received by the material data receiving unit 104, the combining unit 105 combines the piece of material data 403 and the piece of material data 405 with the weather template 2 to produce a data broadcast program 602 shown in FIG. 6.

If a combining operation is performed without checking that version numbers of pieces of material data are the same, a strange data broadcast program can be produced such as "Tonight will be rainy. It will be a fine autumn day".

Moreover, suppose a data broadcast program is produced according to the combining rule 3. The combining instruction unit 103 compares a present date with a date when the former combining operation was performed. When they are different, the combining instruction unit 103 judges whether a present time passes 21:00. When the present time passes 21:00, the combining instruction unit 103 instructs the combining unit 105 to combine a piece of material data of professional baseball, a piece of material data of golf, and a piece of material data of soccer with a sports template. When a piece of material data 406, a piece of material data 407, and a piece of material data 408 (shown in FIG. 4) are received by the material data receiving unit 104, the combining unit 105 combines the piece of material data 406, the piece of material data 407, and the piece of material data 408 with the sports template to produce a data broadcast program 603 (shown in FIG. 6).

Furthermore, suppose a data broadcast program is produced according to the combining rule 4. When a piece of material data of weather or a piece of material data of news is received, the combining instruction unit 103 resets the timer. After thirty seconds, the combining instruction unit 103 instructs the combining unit 105 to combine the latest piece of material data of weather and the latest piece of material data of news with a digest template.

The combining unit 105, for example, combines tomorrow's weather of a piece of material data 401 of weather and a piece of material data of news 409 with the digest template.

The data broadcast program transmitting device 112 outputs a data broadcast program produced and inputted by the combining unit 105 to a multiplexing device 113.

The multiplexing device 113 multiplexes (a) system data such as picture, sound, and EPG (Electric Program Guide) used for normal broadcast programs and (b) a data broadcast program outputted by the data broadcast program transmitting device 112 and broadcasts it.

A broadcast program and a data broadcast program that are broadcasted are received by receiving devices and displayed on monitors. For example, as shown in FIG. 7, a data broadcast program 702 that is produced according to the combining rule 4 is displayed on a monitor 701 with a broadcast program 703.

Figure 8:
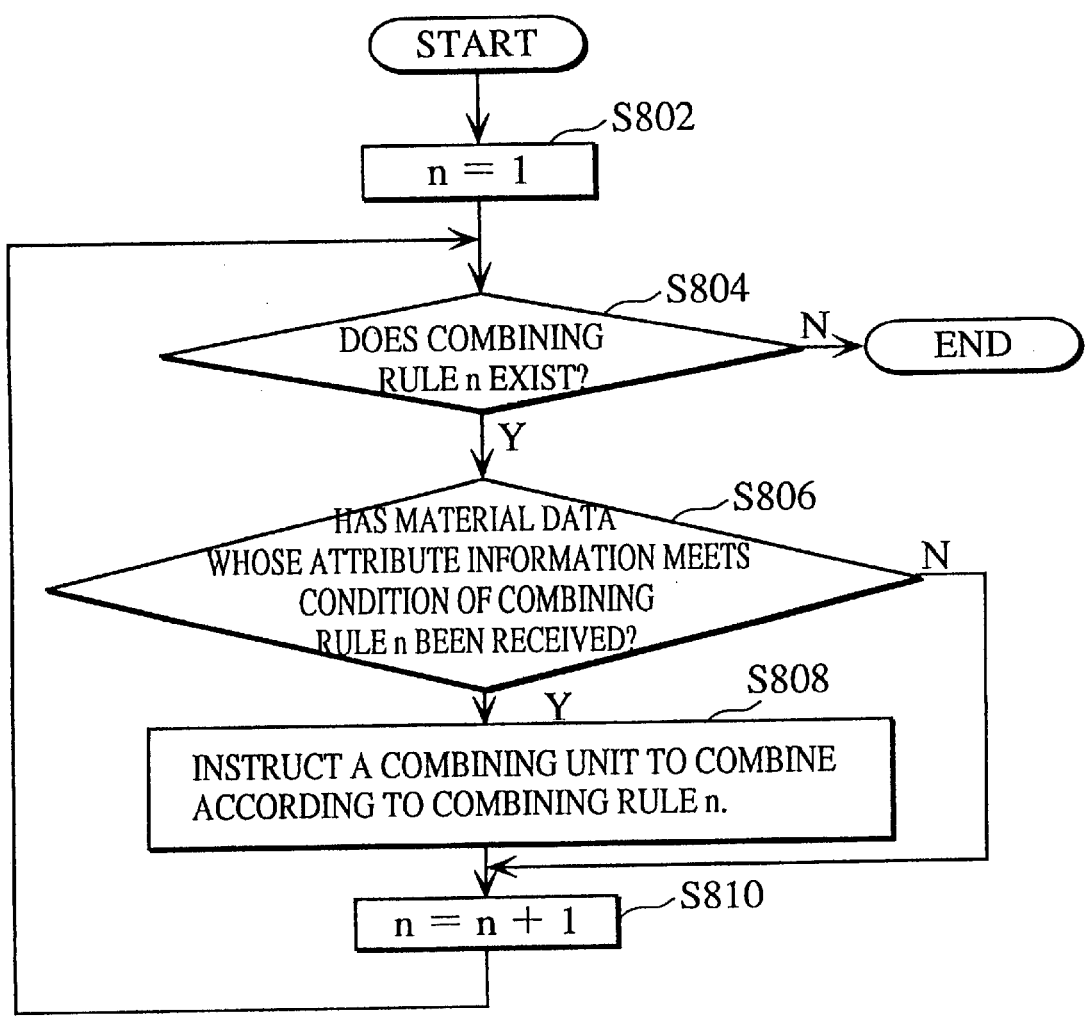
FIG. 8 is a flowchart showing an operation of a combining instruction unit in the first embodiment.
Figure 9:
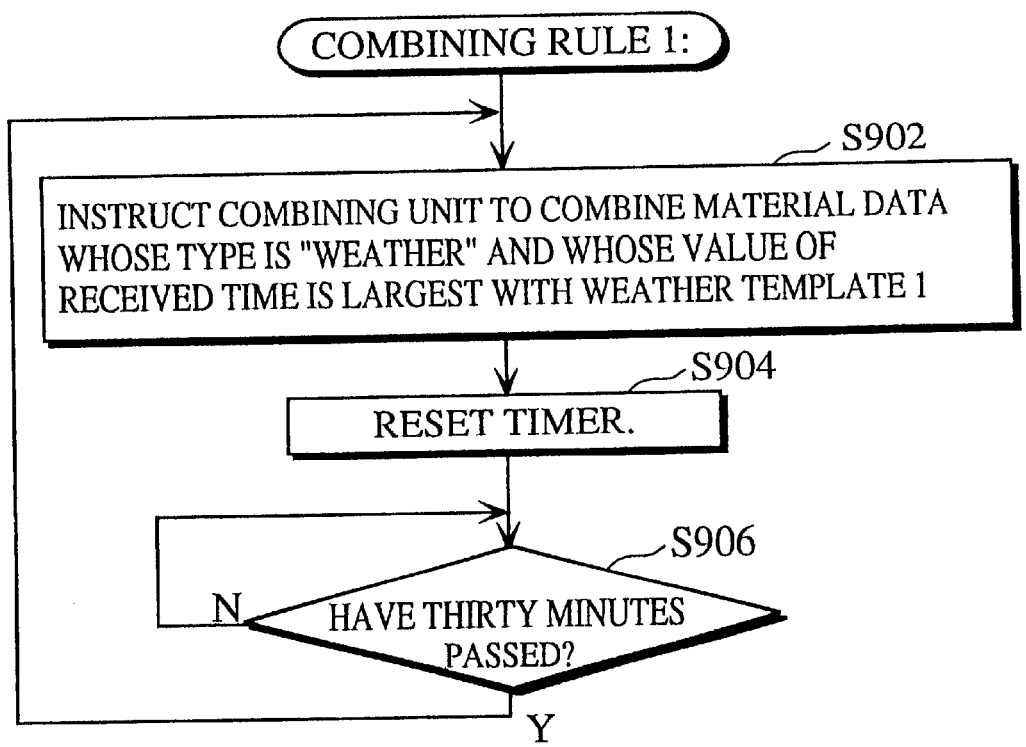
FIG. 9 is a flowchart showing how the combining instruction unit operates according to a combining rule 1 stored in the combining rule storage unit in the first embodiment.
Figure 10:
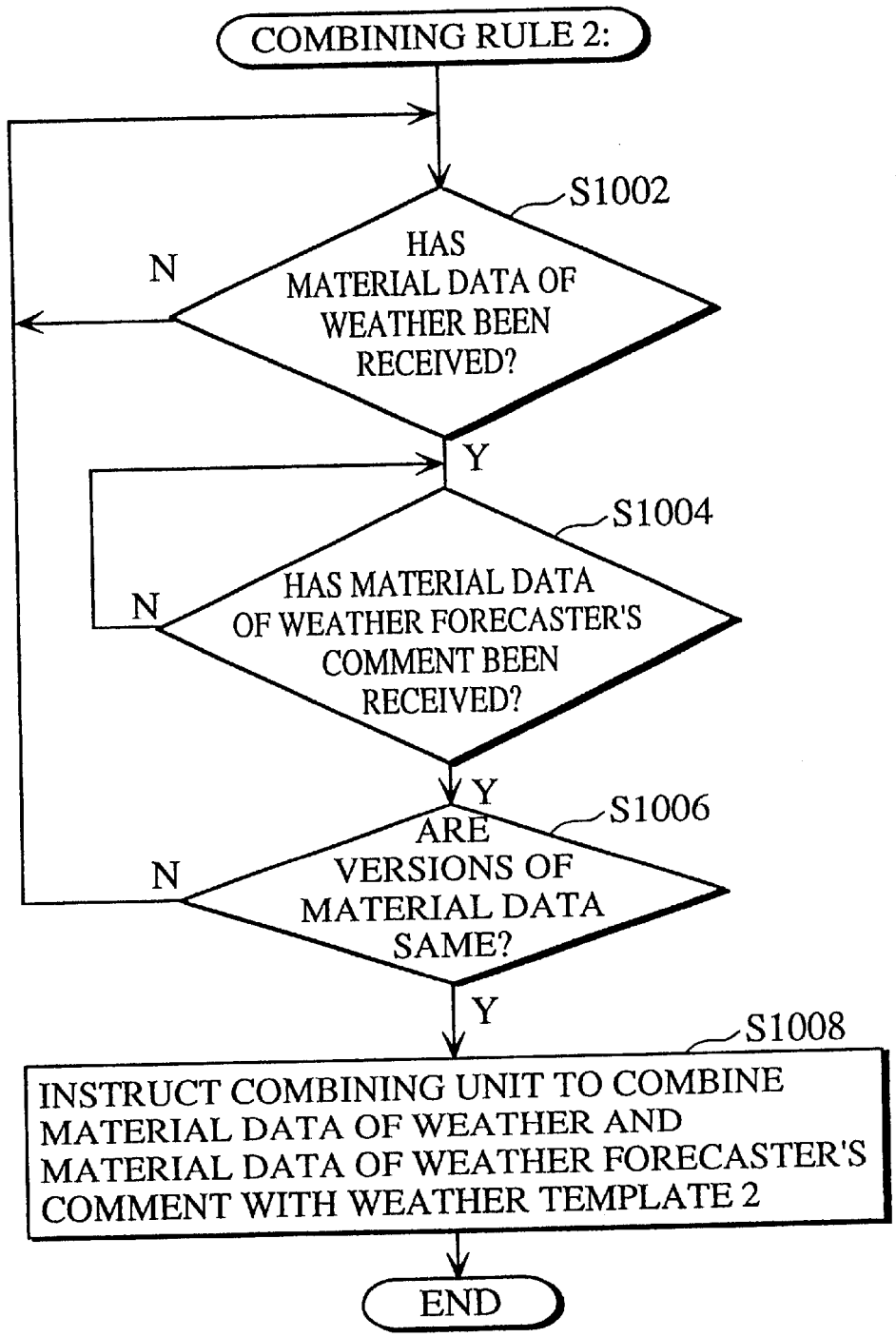
FIG. 10 is a flowchart how the combining instruction unit operates according to a combining rule 2 stored in the combining rule storage unit in the first embodiment.
Figure 11:
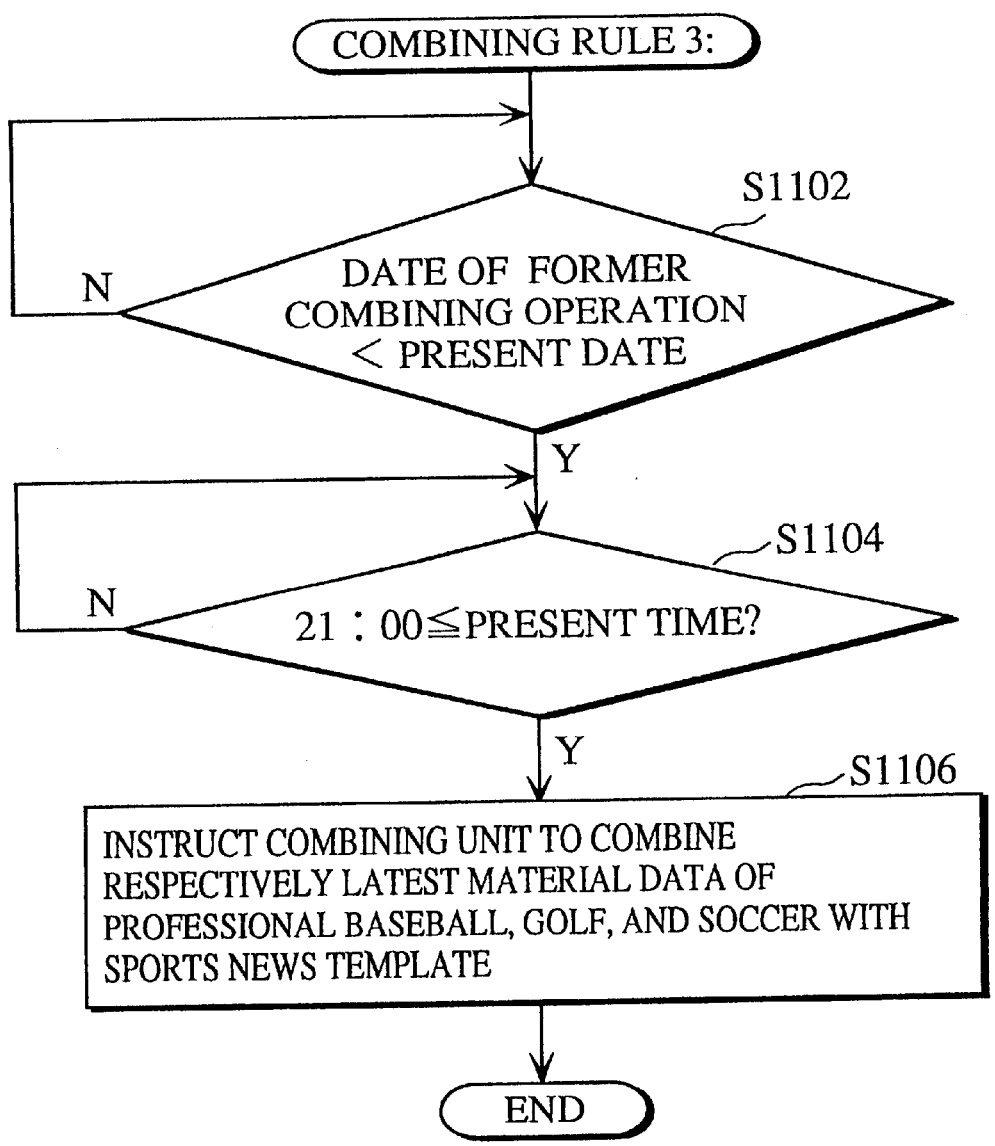
FIG. 11 is a flowchart showing how the combining instruction unit operates according to a combining rule 3 stored in the combining rule storage unit in the first embodiment.
Figure 12:
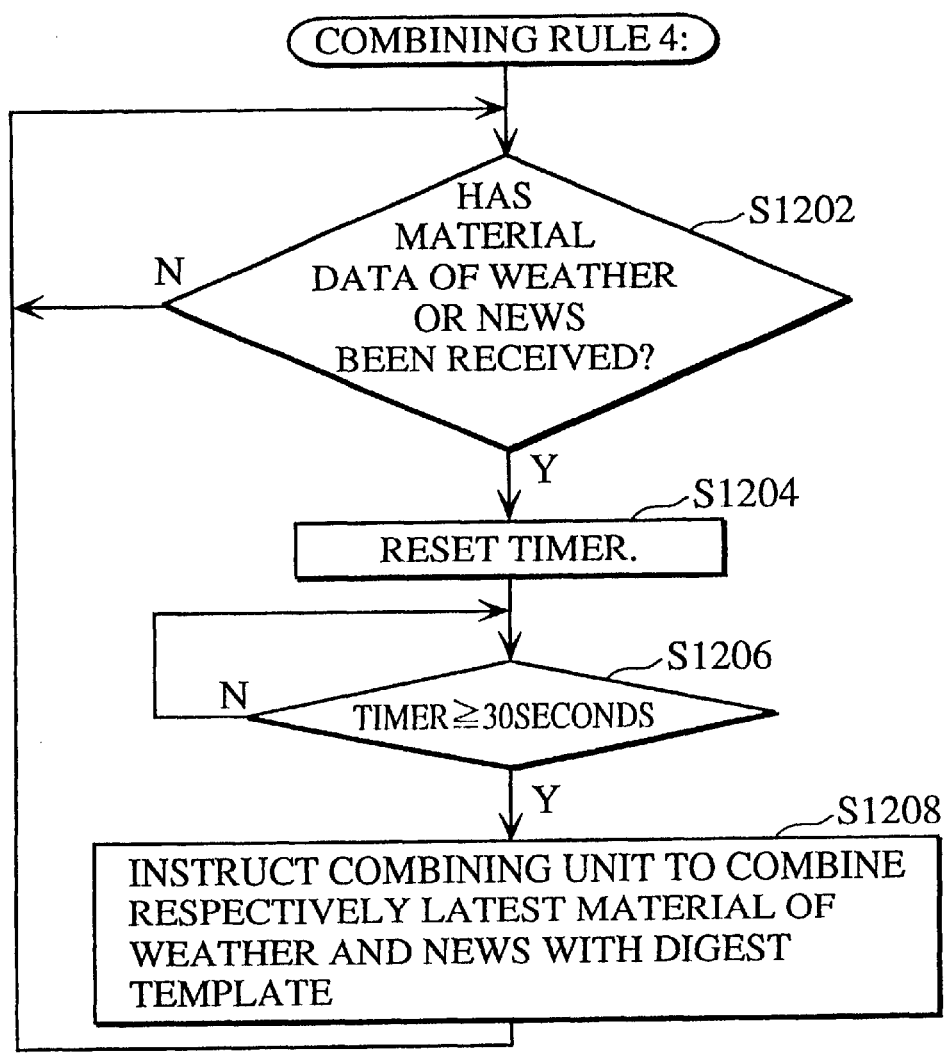
FIG. 12 is a flowchart showing how the combining instruction unit operates according to a combining rule 4 stored in the combining rule storage unit in the first embodiment.

A processing operation in the present embodiment is described with a flowchart in FIG. 8 focusing on the combining instruction unit 103 as followings.

First, the combining instruction unit 103 sets 1 to a counter n (S802) and judges whether a combining rule n is stored in the combining rule storage unit 102 (S0804). Secondly, when the combining rule n is stored, the combining instruction unit 103 judges whether a piece of material data which is received by the material data receiving unit 104 meets a combining condition of the combining rule n with reference to attribute information of the piece of material data (S0806). Thirdly, when the piece of material data meets the combining condition, the combining instruction unit 103 instructs the combining unit 105 to perform a combining operation according to the combining rule n (S808). Otherwise, the combining instruction unit 103 does not perform the combining operation. Finally, the combining instruction unit 103 adds 1 to n in the counter n (S810) and returns to S804. If the combining rule n does not exist at S804, the combining instruction unit 103 completes the processing.

Each processing operation of the combining rule n from S806 to S808 is described with flowcharts in FIG. 9, 10, 11, and 12 as below.

When the combining rule 1 is applied, a processing operation from S806 to S808 is as followings. The combining instruction unit 103 instructs the combining unit 105 to combine a piece of material data whose type is "weather" and whose received time is the latest according to the attribution information table 501 with the weather template 1 (S902). Then, the combining instruction unit 103 resets the timer (S904), waits for thirty minutes (S906), and returns to S902.

When the combining rule 2 is applied, a processing operation from S806 to S808 is as followings. The combining instruction unit 103 judges that a piece of material data of weather has been received (S1002) and then judges that a piece of material data of weather forecaster's comment has been received (S1004). Next, the combining instruction unit 103 judges whether version numbers of the pieces of material data are the same (S1006). When they are the same, the combining instruction unit 103 instructs the combining unit 105 to combine the piece of material data of weather and the piece of material data of weather forecaster's comment with the weather template 2. Then, the combining instruction unit 103 completes this processing, otherwise returns to S1002.

When the combining rule 3 is applied, a processing operation from S806 to S808 is as followings. The combining instruction unit 103 compares a value of a present date with a value of a date when the former combining operation was performed until a value of the present date become larger (S1102). Next, the combining instruction unit 103 judges that a present time passes 21:00 (S1104). Then, the combining instruction unit 103 instructs the combining unit 105 to combine a piece of material data of professional baseball, a piece of material data of golf, and a piece of material data of soccer, whose values of received times are respectively the largest, with the sports template (S1106).

When the combining rule 4 is applied, a processing operation from S806 to S808 is as followings. When receiving a piece of material data of weather or a piece of material data of news, the combining instruction unit 103 resets the timer (S1204). Thirty seconds later (S1206), the combining instruction unit 103 instructs the combining unit 105 to combine the piece of material data of weather and the piece of material data of news, whose values of received times are respectively the largest, with the digest template (S1208).

Here, in this embodiment, data formats of data broadcast programs are BML and PNG. However, the present invention is independent of data formats and can be applied to produce data broadcast programs using other languages, such as HTML, GIF, and JPEG.

Second Embodiment

The second embodiment of the data broadcast program apparatus in the present invention will be described as below.

Here, this embodiment relates to combining of a piece of material data and a template when a piece of image data is transmitted as the piece of material data from the material data transmitting units 110, 111, or the like, and a data broadcast program producing apparatus in this embodiment has the same construction as that in the first embodiment. Therefore, descriptions of the same features are omitted, and only specific features are described here.

A template storage unit 101 stores a plurality of templates which are combined with pieces of image data.

FIG. 13 shows templates stored in the template storage unit 101.

A template 1301 is a landscape image template that has a landscape image frame 1304. A template 1302 is a normal image template that has a normal image frame 1305. A template 1303 is a portrait image template that has a portrait image frame 1306.

A combining rule storage unit 102 stores a plurality of combining rules that show, when a piece of image data is received, how to select a template to be combined with the piece of image data.

FIG. 14 shows part of combining rules. Combining rules 5, 6, and 7 include conditions for combining a piece of image data with templates 1301, 1302, and 1303, respectively, stored in the template storage unit 101.

A combining condition of the combining rule 5 is that a value of width divided by height of image data is 4.0. A combining condition of the combining rule 6 is that the value is 1.33. A combining condition of the combining rule 7 is that the value is 0.6. When meeting a condition of any of the combining rules, the piece of image data is combined with a template that is specified in the combining rule.

When the material data receiving unit 104 receives a piece of image data as material data from the material data transmitting unit 110 or the like, the combining instruction unit 103 reads the combining rules 5, 6, and 7 from the combining rule storage unit 102. Then, the combining instruction unit 103 reads values of width and height from a size column of header information accompanying the piece of image data and divides the value of the width by the value of the height. Next, the combining instruction unit 103 uses the result to judge whether the image data meets a condition of any of the combining rule 5, 6, and 7. Finally, the combining instruction unit 103 instructs the combining unit 105 to combine the piece of image data with one of the templates 1301, 1302, and 1303 that is specified in the combining rule whose condition is met.

Here, the combining rule 5, 6, and 7, shown in FIG. 14, indicate definite values as conditions for combining, but the values can be replaced by ranges like combining rules 8, 9, and 10 shown in FIG. 15.

With this, the template storage unit 101 does not have to store too many templates to correspond to a variety of sizes of image data.

For example, a piece of image data whose value of width divided by height is 2.0 meets the condition of the combining rule 9, equal or greater than 1.0 and less than 2.5, and is combined with the normal image template 1302.

The material data receiving unit 104 receives at least one piece of image data as material data.

Figure 16:
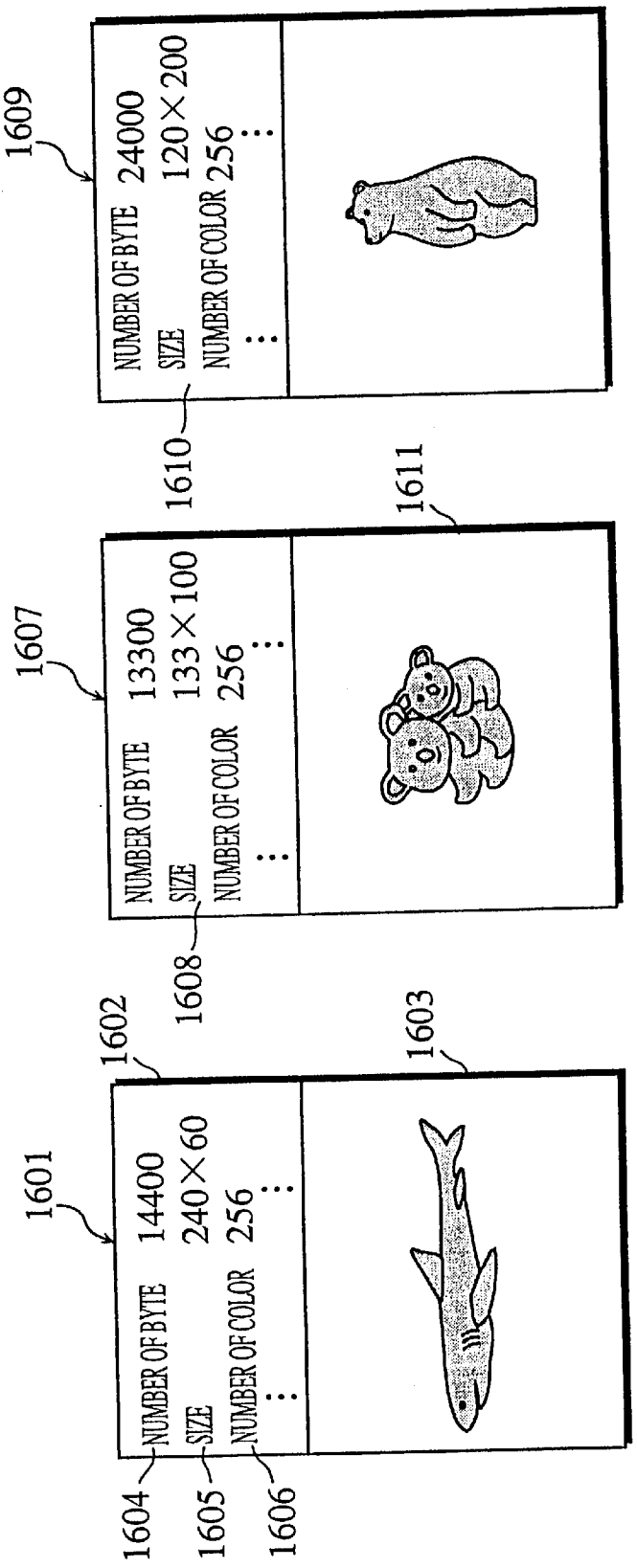
FIG. 16 shows part of models of image data that a material data receiving unit receives in the second embodiment.

FIG. 16 shows constructions of pieces of image data. A piece of image data 1601 is described in JPEG, GIF, PNG, or the like and includes header information 1602 and a data body 1603. The header information 1602 includes a total number of byte 1604, a size 1605, and the number of color 1606 of the piece of image data 1601. The size 1605 is described in the number of pixels showing "the width×the height."

Although the data body 1603 is received as a pixel data string, it is shown as an image of a content in the figure.

The piece of image data 1601 is a landscape image showing "jaws", and a value of width divided by height from the size 1605 is 4.

A piece of image data 1607 is a normal image showing "koala", and a value of width divided by height from a size 1608 is 1.33.

A piece of image data 1609 is a portrait image showing "bear", and a value of width divided by height from a size 1610 is 0.6.

When notified a name of a piece of image data and a name of a template to be combined with the piece of image data by the combining instruction unit 103, the combining unit 105 reads the specified template from the template storage unit 101 and combines the data body with the image frame 1304 or the like.

Now, the template 1301, 1302, and 1303 shown in FIG. 13 are stored in the template storage unit 101, and the combining rules 5, 6, and 7 shown in FIG. 14 are stored in the combining rule storage unit 102. When the piece of image data 1601 shown in FIG. 16 is received by the material data receiving unit 104, the combining instruction unit 103 reads the combining rules 5, 6, and 7 from the combining rule storage unit 102. The combining instruction unit 103 reads the size 1605 from the header information 1602 in the received piece of image data 1601 and divides a value of the width by a value of the height (240/60=4.0). The result meets the condition of the combining rule 5. Therefore, the combining instruction unit 103 instructs the combining unit 105 to combine the piece of image data 1601 with the landscape image template.

FIG. 17(*a*) shows data broadcast programs combined in this way. The data broadcast program 1701 is outputted by the combining unit 105 to the data transmitting device 112, multiplexed to be a transport stream, and broadcasted.

In the same way, when a piece of image data 1607 is received by the material data receiving unit 104, the combining instruction unit 103 obtains a value 1.33 by dividing width by height based on a size 1608 of the piece of image data 1607 and judges that the value meets the condition of the combining rule 6. The combining instruction unit 103 instructs the combining unit 105 to combine the piece of image data 1607 with the normal image template in the template storage unit 101.

The combining instruction unit 105 reads the normal image template 1302 from the template storage unit 101 and put a data body 1611 of the piece of image data 1607 into an image frame 1305.

As a result of the processing, the data broadcast program shown in FIG. 17(*b*) is produced.

A processing operation in the present embodiment is described with a flowchart in FIG. 18 as below.

The material data receiving unit 104 receives a piece of material data by the material data transmitting units 110 or the like. The combining instruction unit 103 judges that the piece of material data is image data (S1802).

The combining instruction unit 103 reads the combining rules 5, 6, and 7 stored in the combining rule storage unit 102 (S1804). Then, the combining instruction unit reads a size of the received piece of image data from header information of the piece of image data (S1806) and divides a value of width by a value of height (S1808). Next, the combining instruction unit 103 judges whether a result meets a condition of any of the combining rules (S1810).

When the result does not meet any condition, the combining instruction unit 103 completes the processing, otherwise notifies the combining unit 105 of a name of a template to be combined with the piece of image data.

The combining unit 105 reads the template that is specified by the combining instruction unit 103 from the template storage unit 101 and puts the data body of the piece of image data received by the material data receiving unit 104 into an image frame (S1814).

The combining instruct 105 outputs the data broadcast program produced through the processing to the data broadcast program transmitting device (S1816) and completes the processing.

Here, when the combining rules 8, 9, and 10 shown in FIG. 15 are stored in the combining rule storage unit 102, the combining unit 105 calculates a width-to-height ratio of an image frame that is specified by the combining instruction unit 103. For example, when the template is the landscape template 1301, the width-to-height ratio of an image frame 1304 is 4.0. On the other hand, a width-to-height ratio of the received piece of image data obtained by the combining instruction unit 103 is 3.2. Therefore, the combining unit 105 increases the piece of image data by 4.0/3.2=1.25 times in a transverse direction and put it into the image frame 1304.

In other words, the combining unit 105 adjusts the piece of image data to coincide with the image frame and puts the image data into the image frame.

Figure 18:
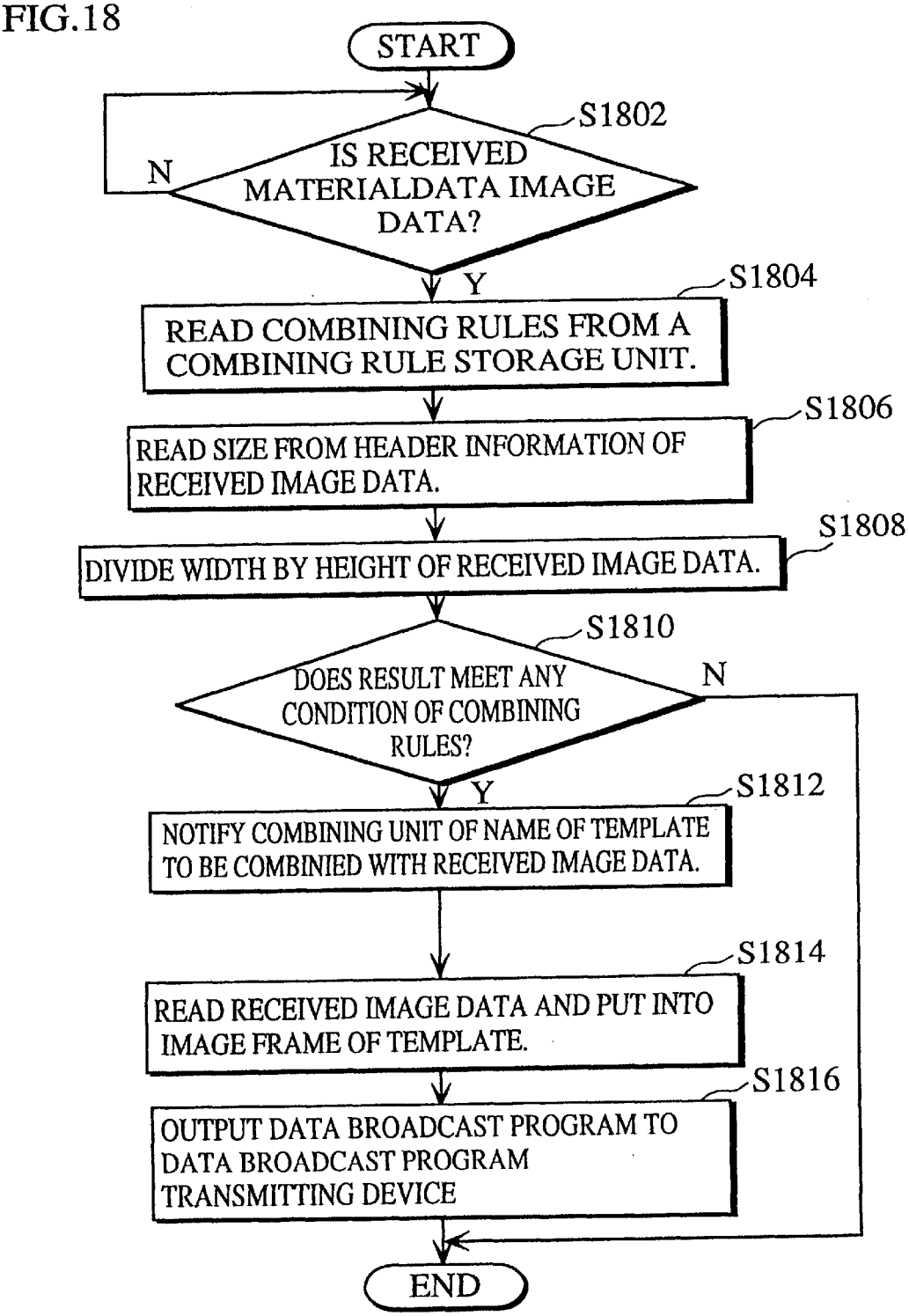
FIG. 18 is a flowchart showing an operation of the second embodiment.

In a flowchart S1814 shown in FIG. 18, the combining unit 105 calculates the width-to-height ratio of the image frame, increases or decreases one of the width and the height of the piece of image data to coincide with the ratio of the width to the height of the image frame and puts the piece of image data into the image frame.

Also, in the present embodiment, as described above, other combining rules for combining the first embodiment with other kinds of material data can be stored in the combining rule storage unit 102.

Here, although the construction of the two embodiments is shown in FIG. 1, functions of each components can be carried out by a computer program. The program stored in a computer-readable recording medium such as an IC card, an optical disc, and a floppy disc can be applied to a data broadcast program producing apparatus that does not have functions of combining each piece of material data or each set of material data with a corresponding template timely.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data broadcast program producing apparatus comprising:

template storage means for storing a plurality of templates;

material data receiving means for receiving at least one piece of material data for a data broadcast program, each piece of material data being accompanied by a plurality of pieces of attribute information;

combining rule storage means for storing a plurality of combining rules, each combining rule associating a combining condition with one of the plurality of templates stored in the template storage means;

judging means for judging whether a combining condition of any of the plurality of combining rules is met, based on a combination of at least two pieces of attribute information accompanying the at least one piece of material data received by the material data receiving means; and combining means for combining, when the judging means judges that the combining condition is met, the at least one piece of material data with a template associated with the combining condition, in accordance with the combining rule.

2. The data broadcast program producing apparatus of claim 1, wherein the plurality of pieces of attribute information accompanying each piece of material data includes at least two out of (a) a type of the piece of material data, (b) a version number of the piece of material data, and (c) a time at which the piece of material data was received, and wherein each combining rule stored in the combining rule storage means (a) indicates a combining condition whose first criterion is a type of the piece of material data and (b) specifies a template which is to be combined with the piece of material data.

3. The data broadcast program producing apparatus of claim 2, wherein the combining condition specifies a combination of a plurality of different types of pieces of material data.

4. The data broadcast program producing apparatus of claim 3, wherein the combining condition is that the plurality of different types of pieces of material data has a same version number.

5. The data broadcast program producing apparatus of claim 3, wherein the judging means has a timer, and the combining condition is a predetermined time of day.

6. The data broadcast program producing apparatus of claim 3, wherein the combining condition is that when a new piece of material data is received, a predetermined period has passed after any piece of material data was received.

7. The data broadcast program producing apparatus of claim 2, wherein the combining condition is that either of a version number or a received time shows that a predetermined type of a new piece of material data has been received by the material data receiving means while checking that a piece of material data has been received at predetermined intervals.

8. The data broadcast program producing apparatus of claim 2, wherein the plurality of templates includes templates that each hold an image frame having a different width-to-height ratio, wherein when the piece of material data is image data, the image data is further accompanied by a piece of attribute information showing a width and a height of the image data, wherein when the piece of material data is image data, the combining condition is that a width-to-height ratio of the image data is a predetermined value, and wherein the judging means calculates the width-to-height ratio of the image data from the piece of attribute information showing the width and the height of the image data to judge whether a combining condition of any of the combining rules is met.

9. The data broadcast program producing apparatus of claim 8, wherein the combining means includes:

an image frame ratio calculating unit for calculating a width-to-height ratio of an image frame of the template associated with the combining condition in the combining rule when the combining condition is that a width-to-height ratio of the image data is in a predetermined range;

a width-to-height ratio judging unit for judging whether the width-to-height ratio of the image data calculated by the judging means is same as the width-to-height ratio of the image frame; and an image data adjusting/combining unit for, (a) when the width-to-height ratio of the image data is the same as the width-to-height ratio of the image frame, combining of image data with the template and, (b) when the width-to-height ratio of the image data is different from the width-to-height ratio of the image frame, adjusting a size of the image data by either increasing or decreasing one of the width and the height of the image data so that the width-to-height ratio of the image data becomes same as the width-to-height ratio of the image frame and combining of image data with the template.

10. A computer program for a data broadcast program producing apparatus that includes: a template storage unit for storing a plurality of templates; and a combining rule storage unit for storing a plurality of combining rules that associate combining conditions with templates stored in the template storage unit, the computer program comprising:

a material data receiving step for receiving at least one piece of material data for a data broadcast program, each piece of material data being accompanied by a plurality of pieces of attribute information;

a judging step for judging whether a combining condition of any of the plurality of combining rules is met, based on a combination of at least two pieces of attribute information accompanying the at least one piece of material data received by the material data receiving step; and a combining step for combining, when the judging step judges that the combining condition is met, the at least one piece of material data with a template associated with the combining condition, in accordance with the combining rule.

11. A computer-readable recording medium storing a computer program for a data broadcast program producing apparatus that includes: a template storage unit for storing a plurality of templates and a combining rule storage unit for storing a plurality of combining rules that associates combining conditions with templates stored in the template storage unit, the computer program comprising:

a material data receiving step for receiving at least one piece of material data for a data broadcast program, each piece of material data being accompanied by a plurality of pieces of attribute information;

a judging step for judging whether a combining condition of any of the plurality of combining rules is met, based on a combination of at least two pieces of attribute information accompanying the at least one piece of material data received by the material data receiving step; and a combining step for combining, when the judging step judges that the combining condition is met, the at least one piece of material data with a template associated with the combining condition, in accordance with the combining rule.

* * * * *